(12) United States Patent
Krneta et al.

(10) Patent No.: US 7,397,571 B2
(45) Date of Patent: Jul. 8, 2008

(54) METHODS AND SYSTEMS FOR LASER MODE STABILIZATION

(75) Inventors: Vladimir Krneta, Boulder, CO (US); Larry Fabiny, Boulder, CO (US); Ian R. Redmond, Boulder, CO (US); Brian Riley, Firestone, CO (US); Aaron Wegner, Longmont, CO (US); Susan Hunter, Fort Collins, CO (US)

(73) Assignee: Inphase Technologies, Inc., Longmont, CO (US)

( * ) Notice: Subject to any disclaimer, the term of this patent is extended or adjusted under 35 U.S.C. 154(b) by 85 days.

(21) Appl. No.: 11/440,446

(22) Filed: May 25, 2006

(65) Prior Publication Data

US 2006/0279822 A1 Dec. 14, 2006

Related U.S. Application Data

(60) Provisional application No. 60/684,531, filed on May 26, 2005.

(51) Int. Cl.
*G01B 9/02* (2006.01)
(52) U.S. Cl. .................................... 356/520
(58) Field of Classification Search .................. 356/520
See application file for complete search history.

(56) References Cited

U.S. PATENT DOCUMENTS

| | | | |
|---|---|---|---|
| 5,066,088 A | 11/1991 | Davies et al. |
| 5,123,073 A | 6/1992 | Pimpinella |
| 5,499,732 A | 3/1996 | Nishimoto |
| 5,500,910 A | 3/1996 | Boudreau et al. |
| 5,692,083 A | 11/1997 | Bennett |
| 5,710,672 A | 1/1998 | Roberts et al. |
| 5,719,691 A | 2/1998 | Curtis et al. |
| 5,886,971 A | 3/1999 | Feldman et al. |
| 5,912,872 A | 6/1999 | Feldman et al. |
| 5,932,045 A | 8/1999 | Campbell et al. |
| 5,956,106 A | 9/1999 | Peterson et al. |
| 6,081,381 A | 6/2000 | Shalapenok et al. |
| 6,103,454 A | 8/2000 | Dhar et al. |
| 6,104,690 A | 8/2000 | Feldman et al. |

(Continued)

FOREIGN PATENT DOCUMENTS

WO  WO 2005/059902 A3  6/2005

OTHER PUBLICATIONS

Y. Nakayama, et al., "Diffuser with Pseudorandom Phase Sequence," *Opt. Soc. Am.*, vol. 69 (No. 10), (Oct. 1979), pp. 1367-1372.

(Continued)

*Primary Examiner*—Michael A Lyons
(74) *Attorney, Agent, or Firm*—Jagtiani + Guttag

(57) ABSTRACT

Systems and methods are provided or use with a light source which generates a light beam. These systems may include a detector which detects light beam information and which determines whether multiple modes are present in the light beam so that the light source may be adjusted. These systems may further include a beam splitting device, such as an optical wedge, to provide two sample beams that intersect to provide a fringe pattern. The detector may then detect this fringe pattern and compute a visibility value that may be used to determine whether multiple modes are present.

25 Claims, 12 Drawing Sheets

U.S. PATENT DOCUMENTS

| | | | |
|---|---|---|---|
| 6,137,601 A | 10/2000 | Khoury et al. | |
| 6,265,240 B1 | 7/2001 | Dautartas et al. | |
| 6,344,148 B1 | 2/2002 | Park et al. | |
| 6,389,045 B1 | 5/2002 | Mann et al. | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,747,257 B1 | 6/2004 | Farnsworth et al. | |
| 6,765,061 B2 | 7/2004 | Dhar et al. | |
| 6,768,426 B2 | 7/2004 | Nekado et al. | |
| 6,780,546 B2 | 8/2004 | Trentler et al. | |
| 6,796,697 B1 | 9/2004 | Bragg et al. | |
| 6,862,121 B2 | 3/2005 | Psaltis et al. | |
| 6,870,863 B1 * | 3/2005 | Butler et al. | 372/29.014 |
| 6,909,529 B2 | 6/2005 | Curtis | |
| 6,925,225 B2 | 8/2005 | Engel et al. | |
| 6,940,606 B2 * | 9/2005 | Boye | 356/520 |
| 6,956,998 B2 | 10/2005 | Shahar et al. | |
| 6,992,774 B2 * | 1/2006 | Creasey et al. | 356/450 |
| 6,992,805 B2 | 1/2006 | Ingwall et al. | |
| 7,027,197 B2 | 4/2006 | Newswanger et al. | |
| 2003/0206320 A1 | 11/2003 | Cole et al. | |
| 2004/0027625 A1 | 2/2004 | Trentler et al. | |
| 2004/0027668 A1 | 2/2004 | Ayres | |
| 2004/0223330 A1 | 11/2004 | Broude et al. | |
| 2005/0013231 A1 | 1/2005 | Kawano et al. | |
| 2005/0041000 A1 | 2/2005 | Plut | |
| 2005/0141810 A1 | 6/2005 | Vaez-Iravani et al. | |
| 2005/0146762 A1 | 7/2005 | Hoogland et al. | |
| 2005/0190451 A1 | 9/2005 | Hansen | |
| 2005/0270855 A1 | 12/2005 | Earhart et al. | |
| 2005/0270856 A1 | 12/2005 | Earhart et al. | |
| 2005/0286388 A1 | 12/2005 | Ayres et al. | |
| 2006/0274393 A1 | 12/2006 | Fotheringham et al. | |
| 2006/0274394 A1 | 12/2006 | Riley et al. | |
| 2006/0275670 A1 | 12/2006 | Riley et al. | |
| 2006/0279818 A1 | 12/2006 | Ayres et al. | |
| 2006/0279819 A1 | 12/2006 | Krneta et al. | |
| 2006/0279820 A1 | 12/2006 | Riley et al. | |
| 2006/0279821 A1 | 12/2006 | Riley et al. | |
| 2006/0279822 A1 | 12/2006 | Krneta et al. | |
| 2006/0279823 A1 | 12/2006 | Riley et al. | |
| 2006/0279824 A1 | 12/2006 | Riley et al. | |
| 2006/0280096 A1 | 12/2006 | Riley et al. | |
| 2006/0281021 A1 | 12/2006 | Riley et al. | |
| 2006/0291022 A1 | 12/2006 | Redmond et al. | |
| 2006/0291023 A1 | 12/2006 | Riley et al. | |

OTHER PUBLICATIONS

Smothers, et al., "Photopolymers for Holography," *SPIE OE/Laser Conference*, (Los Angeles, Calif., 1990), pp. 1212-03.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A., et al., "Beam-Shaping Optics Expand Excimer Laser Applications," Laser Focus World (Jun. 2005)

McLeod, et al. "Micro-Holographic Multi-Layer Optical Disk Data Storage," *International Symposium on Optical Memory and Optical Data Storage* (Jul. 2005).

Shelby, "Media Requirements for Digital Holographic Data Storage," *Holographic Data Storage*, Section 1.3 (Coufal, Psaltis, Sincerbox Eds. 2003).

* cited by examiner

METHODS AND SYSTEMS FOR LASER MODE STABILIZATION

CROSS-REFERENCE TO RELATED APPLICATIONS

This application makes reference to and claims the benefit of the following co-pending U.S. Provisional Patent Application No. 60/684,531 filed May 26, 2005. The entire disclosure and contents of the foregoing Provisional Application is hereby incorporated by reference. This application also makes reference to the following co-pending U.S. Patent Applications. The first application is U.S. application Ser. No. 11/440,370, entitled "Illuminative Treatment of Holographic Media," filed May 25, 2006. The second application is is U.S. application Ser. No. 11/440,447, entitled "Phase Conjugate Reconstruction of Hologram," filed May 25, 2006. The third application is U.S. application Ser. No. 11/440,448, entitled "Improved Operational Mode Performance of a Holographic Memory System," filed May 25, 2006. The fourth application is U.S. application Ser. No. 11/440,359, entitled "Holographic Drive Head and Component Alignment," filed May 25, 2006. The fifth application is U.S. application Ser. No. 11/440,358, entitled "Optical Delay Line in Holographic Drive," filed May 25, 2006. The sixth application is U.S. application Ser. No. 11/440,357, entitled "Controlling the Transmission Amplitude Profile of a Coherent Light Beam in a Holographic Memory System," filed May 25, 2006. The seventh application is U.S. application Ser. No. 11/440,372, entitled "Sensing Absolute Position of an Encoded Object," filed May 25, 2006. The eighth application is U.S. application Ser. No. 11/440,371, entitled "Sensing Potential Problems in a Holographic Memory System," filed May 25, 2006. The ninth application is U.S. application Ser. No. 11/440,367, entitled "Post-Curing of Holographic Media," filed May 25, 2006. The tenth application is U.S. application Ser. No. 11/440,366, entitled "Erasing Holographic Media," filed May 25, 2006. The eleventh application is U.S. application Ser. No. 11/440,365, entitled "Laser Mode Stabilization Using an Etalon," filed May 25, 2006. The twelfth application is U.S. application Ser. No. 11/440,369, entitled "Holographic Drive Head Alignments," filed May 25, 2006. The thirteenth application is U.S. application Ser. No. 11/440,368, entitled "Replacement and Alignment of Laser," filed May 25, 2006. The entire disclosure and contents of the foregoing U.S. Patent Applications are hereby incorporated by reference.

BACKGROUND

1. Field of the Invention

The present invention relates generally to laser systems, and more particularly, to improved laser mode stabilization.

2. Related Art

Developers of information storage devices continue to seek increased storage capacity. As part of this development, holographic memory systems have been suggested as alternatives to conventional memory devices. Holographic memory systems may be designed to record data one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory systems. Page-wise memory systems may involve the storage and readout of an entire two-dimensional representation, e.g., a page of data. Typically, recording light passes through a two-dimensional array of dark and transparent areas representing data, and the system stores, in three dimensions, the pages of data holographically as patterns of varying refractive index imprinted into a storage medium. See Psaltis et al., "Holographic Memories," *Scientific American,* November 1995, where holographic systems are discussed generally, including page-wise memory systems.

In a holographic data storage system, information is recorded by making changes to the physical (e.g., optical) and chemical characteristics of the holographic storage medium. These changes in the holographic medium take place in response to the local intensity of the recording light. That intensity is modulated by the interference between a data-bearing beam (the data beam) and a non-data-bearing beam (the reference beam). The pattern created by the interference of the data beam and the reference beam forms a hologram which may then be recorded or written in the holographic medium. If the data-bearing beam is encoded by passing the data beam through, for example, a spatial light modulator (SLM), the hologram(s) may be recorded or written in the holographic medium as holographic data.

The formation of the hologram may be a function of the relative amplitudes, phase, coherence, and polarization states of the data and reference beams. It may also depend on the relative wavelength of the data and reference beams, as well as the three dimensional geometry at which the data and reference beams are projected towards the storage medium. The holographically-stored data may be retrieved by performing a data read operation, also referred to as a data reconstruction operation (collectively referred to herein as a "read" operation). The read operation may be performed by projecting a reconstruction or probe beam into the storage medium at the same angle, wavelength, phase, position, etc., as the reference beam used to record or write the data, or compensated equivalents thereof. The hologram and the reconstruction beam interact to reconstruct the data beam which may then be detected by using a sensor, such as a photo-detector, sensor array, camera, etc. The detected reconstructed data may then be processed for delivery to, for example, an output device.

Because the recording and reading of the hologram is a function of the wavelengths, amplitudes, phase, coherence, and polarization states of the light beams used, errors in these light beams may result in errors in the recording and reading of the holographic data. For example, it may be desired that the light beams include only a single longitudinal mode (i.e., a single dominant wavelength), as the presence of multiple longitudinal modes (i.e., multiple wavelengths with significant power) within a light beam may result in reduced hologram strength and subsequently errors when recording data to and/or reading data from a holographic storage medium. The presence of multiple modes in a light beam (e.g., a laser) is typically characterized by the Side Mode Suppression Ratio (SMSR). This is a ratio of the power in the primary wavelength peak to the power in the second most prevalent wavelength peak. A laser operating in single mode has a much higher value of SMSR than one operating in multimode. For example, if the single mode requirement was that the secondary wavelength had a peak power of <1% of the primary lasing wavelength, the SMSR would need to be >20 dB to meet this requirement.

Thus, there may be a need for improved methods and systems for determining whether or not multiple modes are or may be present within a light beam and for adjusting the light source so that is in single mode operation.

SUMMARY

According to a first broad aspect of the present invention, there is provided a system and method for use with a light source which generates a light beam. The system comprises:
- an optical wedge comprising a first partially reflective surface and a second partially reflective surface, wherein the first partially reflective surface reflects a first portion of the light beam using and wherein the second partially reflective surface reflects a second portion of the light beam;
- a detector which detects a fringe pattern resulting from the first and second reflected portions and which provides detected fringe pattern information; and
- a processor which receives the detected fringe pattern information, and which adjusts the light source using the detected fringe pattern information.

According to a second broad aspect, there is provided a system and method for use with a light source which generates a light beam. The system comprises:
- an etalon comprising a first partially reflective surface and a second partially reflective surface; wherein the etalon receives at least a portion of the light beam and wherein a portion of the received light beam exits the etalon;
- a detector which detects an intensity of the portion of the exiting light beam and which provides detected intensity information; and
- a processor which receives the detected intensity information and which adjusts the light source using the detected intensity information.

According to a third broad aspect of the present invention, there is provided a system and method for use with a light source which generates a light beam. The system comprises:
- a detector which detects and provides light beam information; and
- a processor which receives the light beam information, which calculates a visibility value for the light beam using a minimum intensity value and a maximum intensity value based on the received light beam information, which determines whether the visibility value is below a threshold value, and which adjusts a current level of the light source if the visibility value is below the threshold value.

According to a fourth broad aspect of the present invention, there is provided a system and method for use with a light source which generates a light beam. The method comprising the following steps of:
- (a) forming a first portion and a second portion of the light beam using an optical wedge;
- (b) detecting a fringe pattern resulting from an intersection of the first and second portions; and
- (c) adjusting the light source using the detected fringe pattern information According to a fifth broad aspect of the present invention, there is provided a system and method for use with a light source which generates a light beam. The method comprising the following steps of:
- (a) detecting an intensity of a portion of a light beam exiting an etalon; and
- (b) adjusting the light source using the detected intensity information.

According to a sixth broad aspect of the present invention, there is provided a system and method for use with a light source which generates a light beam. The method comprising the following steps of:
- (a) detecting light beam information which includes a minimum intensity value and a maximum intensity value;
- (b) calculating a visibility value using the detected minimum and maximum intensity values;
- (c) determining whether the visibility value is below a threshold value; and
- (d) if the visibility value is below the threshold value, adjusting a current level of the light source.

BRIEF DESCRIPTION OF THE DRAWINGS

The invention will be described in conjunction with the accompanying drawings, in which.

DETAILED DESCRIPTION

Figure 1:
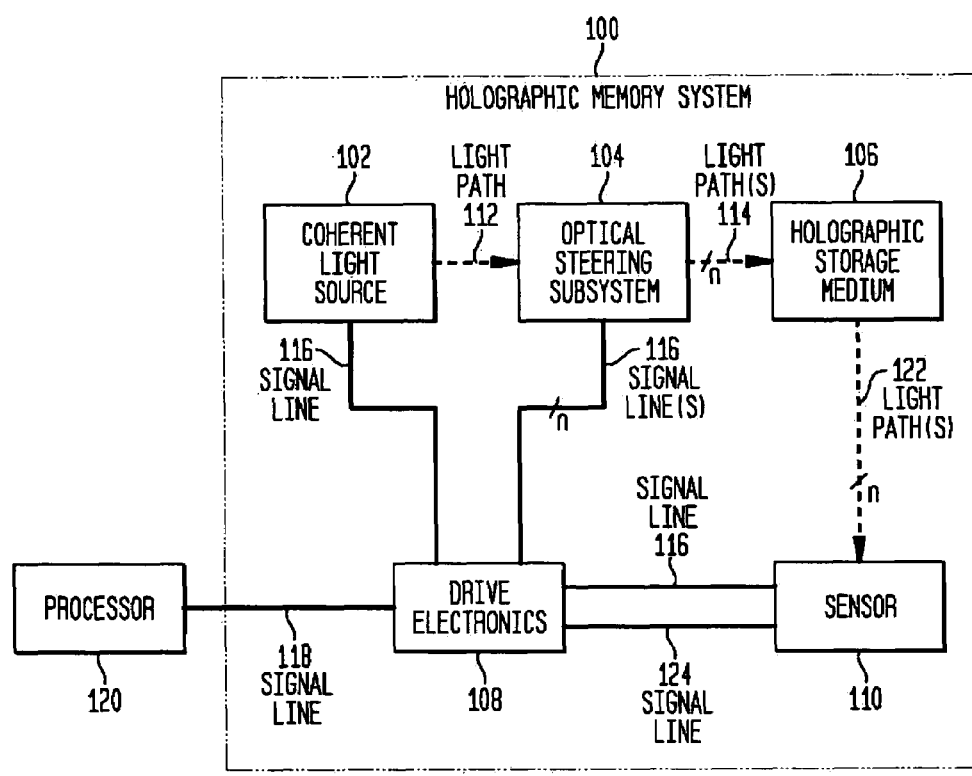
FIG. 1 is a schematic block diagram of an exemplary holographic data storage drive system which embodiments of the present invention may be advantageously implemented.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "mode" refers to a wavelength of light generated by a light source.

For the purposes of the present invention, the term "single mode" refers to a single wavelength of light generated by a light source. For example, a single mode laser produces a single dominant wavelength.

For the purposes of the present invention, the term "multimode" refers to multiple wavelengths of light generated by the light source. For example, a multi-mode laser produces multiple wavelengths of light with significant power.

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded page-wise, the signal beam may be encoded with a data modulator, e.g., a spatial light modulator, etc.

For the purposes of the present invention, the term "holographic recording" refers to the act of recording a hologram in a holographic recording medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "holographic storage medium" refers to a component, material, etc., that is capable of recording and storing, in three dimensions (i.e., the X, Y and Z dimensions), one or more holograms (e.g., bit-wise, linear array-wise or page-wise) as one or more patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320, published Nov. 6, 2003, (Cole et al), and U.S. Patent Application No. 2004-0027625, published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data, one or more pictures, etc., to be recorded or recorded in a holographic medium.

For the purposes of the present invention, the term "recording light" refers to a light source used to record information, data, etc., into a holographic recording medium.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "data modulator" refers to any device that is capable of optically representing data in one or two-dimensions from a signal beam.

For the purposes of the present invention, the term "spatial light modulator" refers to a data modulator device that is an electronically controlled, active optical element.

For the purposes of the present invention, the term "refractive index profile" refers to a two-dimensional (X, Y) mapping of the refractive index pattern recorded in a holographic recording medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the term "partially reflective surface" refers to any surface of an object capable of reflecting a portion of light while allowing another portion to pass through the surface.

For the purposes of the present invention, the term "fringe pattern" refers to a spatial response resulting from the intersection of two or more light beams.

For the purposes of the present invention, the term "detector" refers to any type of device capable of detecting something. For example, exemplary detectors include devices capable of detecting the presence or intensity of light, or for example a fringe pattern.

For the purposes of the present invention, the term "etalon" refers to a device comprising a Fabry-Pérot cavity. Etalons are also sometimes referred to as Fabry-Pérot interferometers. For example, an etalon may comprise a transparent plate with two reflecting surfaces, or two parallel mirrors.

For the purposes of the present invention, the term "partially reflective coating" refers to any coating capable of reflecting a portion of light while allowing another portion to pass through the coating.

Embodiments of the present invention may be used in holographic systems; for example, data storage and retrieval systems that implement holographic optical techniques such as Holographic Data Storage (HDS) Drive Systems. FIG. 1 is a block diagram of an exemplary holographic system in which embodiments of the present invention may be advantageously implemented. It should be appreciated that although embodiments of the present invention will be described in the context of the exemplary holographic system shown in FIG. 1, the present invention may be implemented in connection with any system now or later developed that implements a light source, such as a laser.

HDS Drive System 100 ("holographic system 100" herein) receives along signal line 118 signals transmitted by an external processor 120 to read and write data to a photosensitive holographic storage medium 106. As shown in FIG. 1 processor 120 communicates with drive electronics 108 of holographic system 100. Processor 120 transmits signals based on the desired mode of operation of holographic system 100. For ease of description, the present invention will be described with reference to read and write operations of a holographic system. It should be apparent to one of ordinary skill in the art, however, that the present invention applies to other operational modes of a holographic system, such as Pre-Cure, Post-Cure, Erase, Write Verify, or any other operational mode implemented now or in the future in an holographic system.

Using control and data information from processor 120, drive electronics 108 transmit signals along signal lines 116 to various components of holographic system 100. One such component that may receive signals from drive electronics 108 is coherent light source 102. Coherent light source 102 may be any light source known or used in the art that produces a coherent light beam. In one embodiment of the invention, coherent light source 102 may be a single mode laser that produces a single dominant wavelength at a particular frequency. This single mode laser may in an embodiment be, for example, a laser diode. As is known to those of skill in the art, a laser diode refers to a laser where the active medium is a semiconductor similar to that found in a light-emitting diode. For example, a common type of laser diode is formed from a p-n junction and powered by injected electrical current. These devices are also sometimes referred to as injection laser diodes to distinguish them from optically pumped laser diodes.

Coherent light from coherent light source 102 is directed along light path 112 into an optical steering subsystem 104. Optical steering subsystem 104 directs one or more coherent light beams along one or more light paths 114 to holographic storage medium 106. In the write operational mode described further below at least two coherent light beams are transmitted along light paths 114 to create an interference pattern in holographic storage medium 106. The interference pattern induces material alterations in storage medium 106 to form a hologram, as is well-known in the art.

In the read operational mode, holographically-stored data is retrieved from holographic storage medium 106 by projecting a reconstruction or probe beam along light path 114 into storage medium 106 in a manner well-known in the art. The hologram and the reconstruction beam interact to reconstruct the data beam which is transmitted along light path 122. The reconstructed data beam may be detected by sensor array 110. It would be apparent to one of ordinary skill in the art that sensor array 110 may be any type of detector known or used in the art. In one embodiment, sensor array 110 may be a camera. In another embodiment, sensor array 110 may be a photodetector.

The light detected at sensor array 110 is converted to a signal and transmitted to drive electronics 108 via signal line 124. Processor 120 then receives the requested data or related information from drive electronics 108 via signal line 118.

Coherent light source 102 may be a single mode laser that produces a single dominant wavelength at a particular frequency. Further, as noted above, the presence of multiple modes (i.e., multiple wavelengths with significant power) may result in errors when writing data to and/or reading data from a holographic storage medium, such as, for example, holographic storage medium 106.

In an embodiment of the present invention, a light beam (e.g., a laser beam) may be monitored to determine whether multiple modes (i.e. wavelengths) are present, and if so, light source 102 may be adjusted to remove these other undesirable modes. As will be discussed below in further detail, in an embodiment of the present invention, the current level of light source 102 may be adjusted to help return light source 102 to single mode operation in the event other undesired modes are detected.

Figure 2:
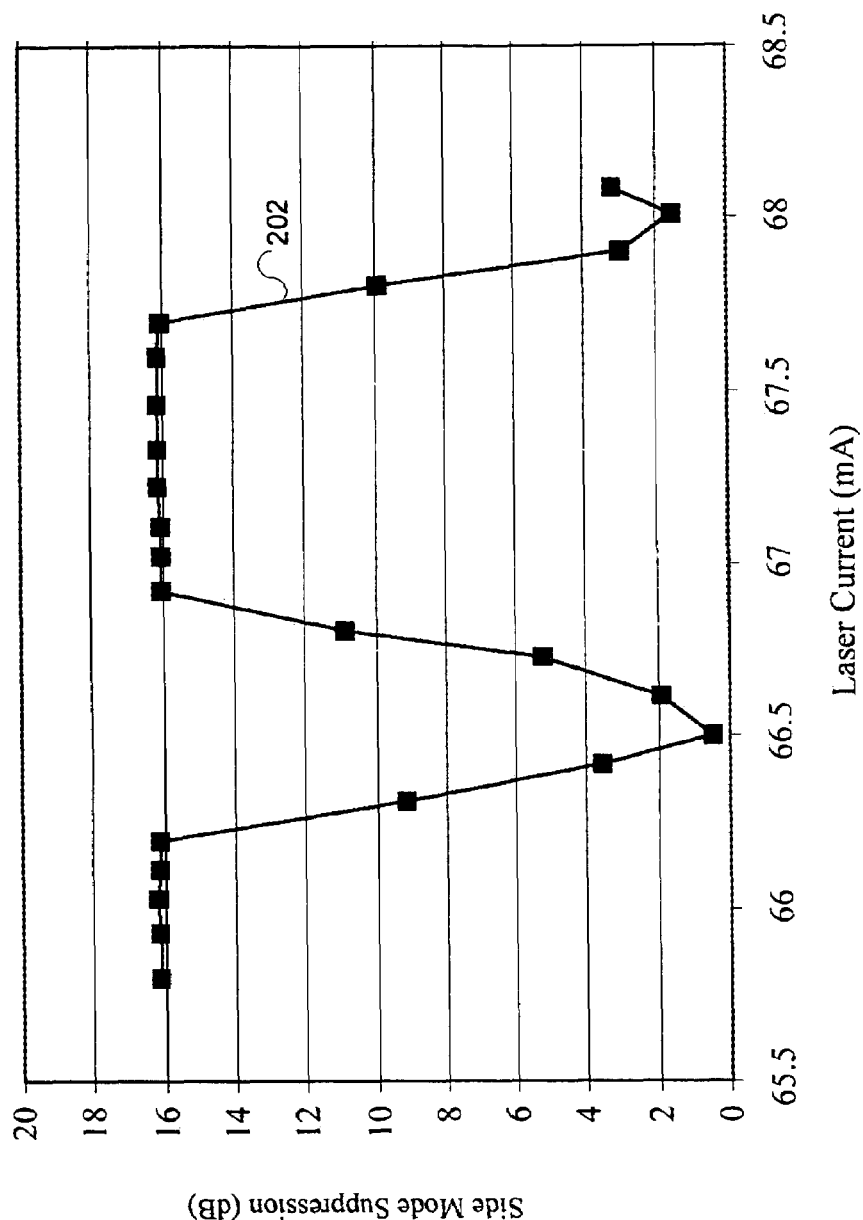
FIG. 2 is a graphical representation of an exemplary curve illustrating side mode suppression versus laser current for an exemplary laser.

FIG. 2 shows an exemplary curve illustrating side mode suppression versus laser current, in an exemplary laser. In some lasers, such as laser diodes, the side mode suppression of the laser varies based on the current supplied to the laser for generating the laser beam. Thus, depending on the current supplied to a laser, the laser may produce for example, a single desired wavelength (i.e., a single mode) or multiple wavelengths (i.e., multi-modes). In the illustrative curve 202 of FIG. 2, the side mode suppression ratio (SMSR) is measured in decibels (dB) and the laser current is measured in milliamps (mA). As shown in FIG. 2, this exemplary laser produces a single mode at currents between approximately 65.7 mA and 66.25 mA and also between 67 mA and 67.75 mA. The laser, however, has poor side mode suppression between 66.25 mA and 67 mA, where it may produce other undesired wavelengths with significant power (modes). As such, in order to ensure that the laser generates only a single mode (wavelength), the current may be maintained in a proper range for generating a single mode.

Figure 3:
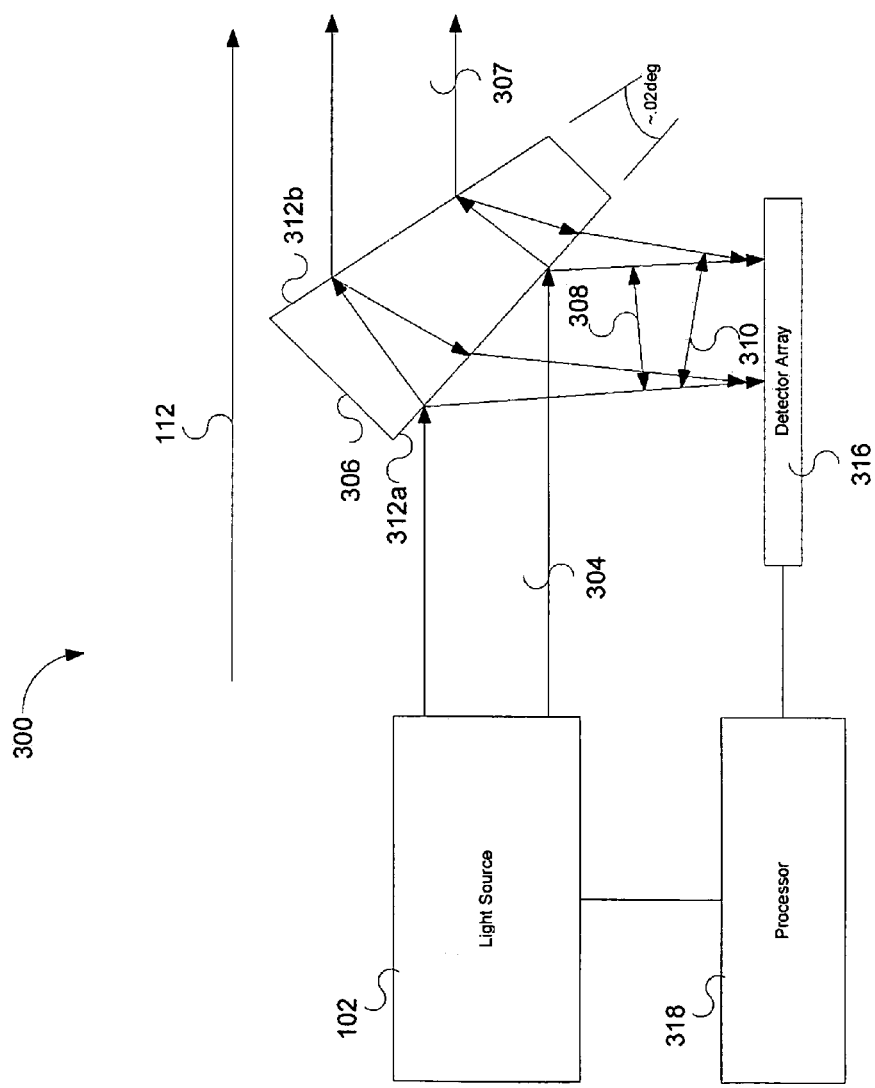
FIG. 3 is an architectural block diagram showing the components of a system for mode stabilization according to an embodiment of the present invention.

FIG. 3 shows an exemplary system, indicated generally as 300, for mode stabilization according to an embodiment of the present invention. As shown in FIG. 3, a coherent main light beam 304 from coherent light source 102 is directed along light path 112. Main beam 304 is directed towards a beam splitting device, which in this example is a partially reflecting optical wedge 306. Optical wedge 306 may, for example, be placed in light path 112, such as, for example, between light source 102 and optical steering subsystem 104 of FIG. 1. In other embodiments, however, optical wedge 206 may be included elsewhere in the system, such as, for example along light path 114 of FIG. 1. Optical wedge 306 may comprise glass, plastic, fused silica, or any other suitable materials. As shown in FIG. 3, optical wedge 306 may cause the formation of sample beams from a portion of main beam 304. The first sample beam is indicated generally as 308, while the second sample beam is indicated generally as 310. The remaining portion of main beam 304 that exits optical wedge 306 is indicated as exiting main beam 307. Additionally, although in this exemplary embodiment the beam splitting device used to provide sample beams 308 and 310 is an optical wedge 306, in other embodiments other beam splitting devices may be used. For example, in other embodiments amplitude-division beam splitting devices may be used that, for example, divide the beam equally at every point across the beam. These beam splitting devices may, for example, use mechanisms, such as, for example, reflection or diffraction. Additional, exemplary beam splitting devices may include, in addition to optical wedge 308, diffractive optical elements, beamsplitters (e.g., cube, flat or pellicle), etc.

As shown in FIG. 3, optical wedge 306 has partially reflective non-parallel sides 312a and 312b. The reflection of main beam 304 from side 312a causes the formation of sample beams 308, while the reflection of main beam 304 from side 312b causes the formation sample beam 310, with sample beam 310 then exiting optical wedge 306 from side 312a. Sides 312a and 312b may be provided with partially reflective coatings. These partially reflective coatings may, for example, be a silver coating, aluminum coating, dielectric coating, etc. These partially reflective coatings may be applied to sides 312a and 312b such that greater than 90% of main beam 304 passes through optical wedge 306 and exits as exiting main beam 307. The partially reflective coatings on sides 312a and 312b may be such that the reflected sample beams 308 and 310 are of approximately equal or similar power.

Depending upon the wedge angle, optical wedge 306 may cause sample beams 308 and 310 to propagate nearly co-linearly with a small angular separation. For example, optical wedge 306 may have a wedge angle of approximately 0.02 degrees. This angle for optical wedge 306 may be determined based on, for example, a desired fringe period at the detector. For example, the angle may be calculated as follows: if the half-angle between the 2 beams from the wedge prism is θ and the wavelength of the light λ, then the fringe period in a plane normal to the line bisecting the 2 beams is $\Lambda=\lambda/(2*\sin(\theta))$. The angle may then be chosen so that the detector array 316 can successfully measure the fringe visibility, e.g., $V=(Imax-Imin)/(Imax+Imin)$, or other measure of the fringe amplitude. Visibility, V, and detector array 316 are discussed in further detail below.

As shown in FIG. 3, when main beam 304 reaches partially reflective side 312a, a portion of main beam 304 is reflected as sample beam 308 in the direction of detector array 316. For example, a partially reflective coating on side 312a may reflect less than about 5% of main beam 304. The initially unreflected fraction 305 may thus comprise about 95% or greater of main beam 304. The unreflected fraction 305 then passes into and is refracted by optical wedge 306. Side 312b also reflects a portion of the initially unreflected fraction 305 of main beam 304 towards or in the direction of side 312a which then refracts the second reflected portion as sample beams 310 towards detector array 316. After reflection/refraction by optical wedge 306, each of sample beams 308 and 310 may contain only a few percent of the incident optical power of main beam 304.

Detector array 316 may be, for example, a two-dimensional detector array, or a one dimensional detector array. Any suitable device for detecting light waves may be used as detector array 316, such as, for example, a charged coupled device (CCD), CMOS array, PIN photodiode array, etc. In one embodiment, detector array 316 may be approximately 2.5 mm long, but other sizes of detector arrays 316 may be used without departing from the scope of the present invention.

Figure 13:
FIG. 13 illustrates an exemplary diagram of a fringe pattern and a region of interest according to an embodiment of the present invention.

When sample beams 308 and 310 reach detector array 316, these beams intersect or overlap, thus causing interference fringes to be formed. The orientation of these interference fringes will be perpendicular to the plane formed by the two sample beams 308 and 310. In this example, this plane is illustrated by line 317 of FIG. 3. The orientation of detector array 316 may be such that it is perpendicular to the interference fringes. FIG. 13 illustrates an exemplary diagram of a fringe pattern 1302 at detector array 316. Detector array 316 may, in this example, take measurements of the fringe pattern in a region of interest 1304. This region of interest 1304 may be, for example, a central portion of the fringe pattern.

The pixel width of detector array 316 may also sufficiently small compared to the period of the fringe pattern (i.e., the distance between minimum and maximum intensities of the fringe pattern) to enable an adequate representation of the cross-section of the fringe pattern to be formed. A further description of exemplary fringe patterns are presented below with reference to FIGS. 4 and 5. As shown in FIG. 3, detector array 316 may be connected to a processor 318 that is capable of receiving the detected fringe pattern(s) from detector array 316, computing a fringe visibility for the fringe pattern(s), and then adjusting light source 102 (e.g., laser) based on this computed fringe visibility.

The fringe visibility may be calculated using a cross-section of the fringe pattern by determining the maximum and minimum intensities (Imax and Imin) of the set of detected signals from detector array 316 in the central portion of the image. The visibility, V, may be calculated using the following formula: $V=(Imax-Imin)/(Imax+Imin)$. The visibility, V, varies from 0 to 1, with V=1 corresponding to complete coherence between sample beams 308 and 310, and V=0 corresponding to complete incoherence between sample beams 308 and 310. A visibility, V, approaching 1 corresponds to when light source 102 (e.g., laser) is in single mode operation and a decreasing visibility, V, indicates the presence of additional modes. A more detailed description of an exemplary method for adjusting the laser current source in order to maintain single mode operation using the detected fringe visibility is presented below with reference to FIG. 6.

Processor 318 may be any type of device capable of executing an algorithm. Further, it should be noted that this is a simplified diagram and additional items may be present, such as, for example, memory (e.g., random access memory (RAM)), storage devices (e.g., an internal or external hard drive), one or more buses, etc. Further, processor 318 may, for example, be connected to processor 120 of FIG. 1 for exchanging information between processor 318 and 120, such as, for example, to enable processor 120 to monitor information regarding the lasing mode(s) of coherent light source 102.

Figure 4:
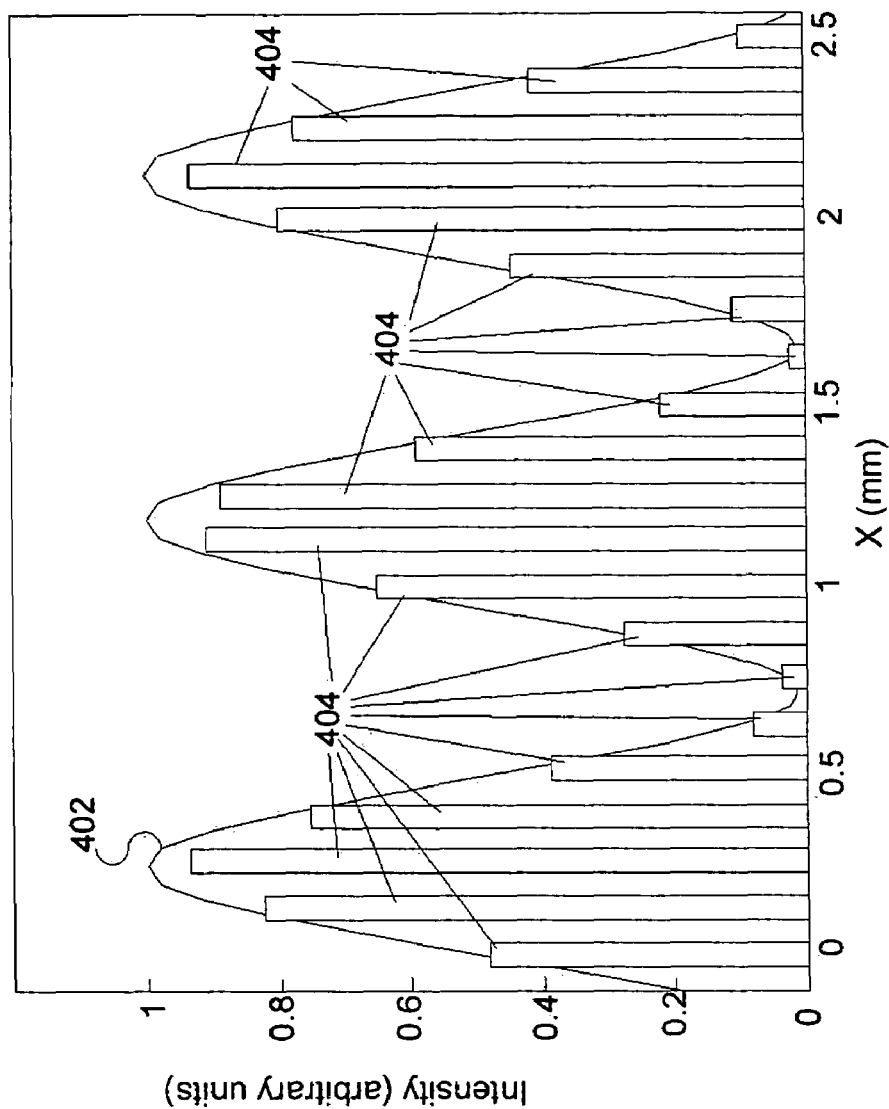
FIG. 4 is a graphical representation illustrating an exemplary fringe pattern for a single mode laser.

FIG. 4 shows an exemplary fringe pattern for a single mode laser. FIG. 4 illustrates both an exemplary fringe pattern 402 and exemplary values 404 detected by detector array 316 for this exemplary fringe pattern 402. As shown, fringe pattern 402 has a maximum detector reading of 0.94au (arbitrary units of optical power) at approximately 2.1 mm along the length of detector array 316. As further shown, fringe pattern 402 has a minimum of approximately 0.02au at detector array 316 located at approximately 1.6 mm along the length of detector array 316. As further shown, fringe pattern 402 has a minimum of approximately 0.02 au at detector array 316 located at approximately 1.6 mm along the length of detector array 316. Using the above formula for calculating the visibility, $V=(0.94-0.02)/(0.94+0.02)$ or $V=0.96$, thus indicating the laser (as coherent light source 102) is producing only a single mode. Although ideally in single mode operation if the strength of the 2 beams forming the fringe pattern are equal, the visibility should be 1.0, in practice an acceptable value for visibility may depend on the actual ratio of powers of the two sample beams, the prism thickness, detector position and geometry, and the tolerable SMSR.

Figure 5:
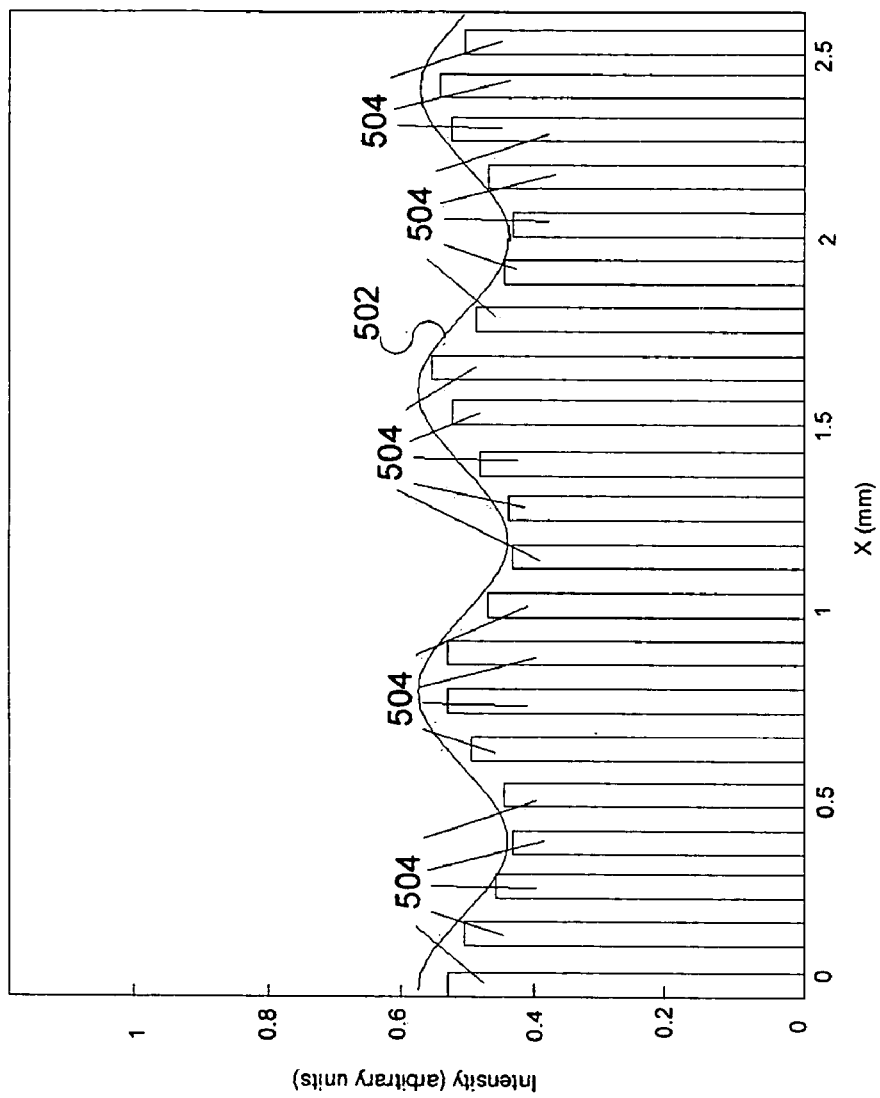
FIG. 5 is a graphical representation illustrating an exemplary fringe pattern for a multi mode laser.

FIG. 5 shows an exemplary fringe pattern for a multi mode laser. As shown, fringe pattern 502 is flatter than fringe pattern 402 of FIG. 4 and has a maximum of approximately 0.58au at approximately 1.6 mm along the length of detector array 316. As further shown, fringe pattern 502 has a minimum of 0.42au at approximately 1.2 mm along the length of detector array 316. Thus, using the above formula for calculating visibility, $V=(0.52-0.42)/(0.52+0.42)$, or $V=0.10$.

Figure 6:
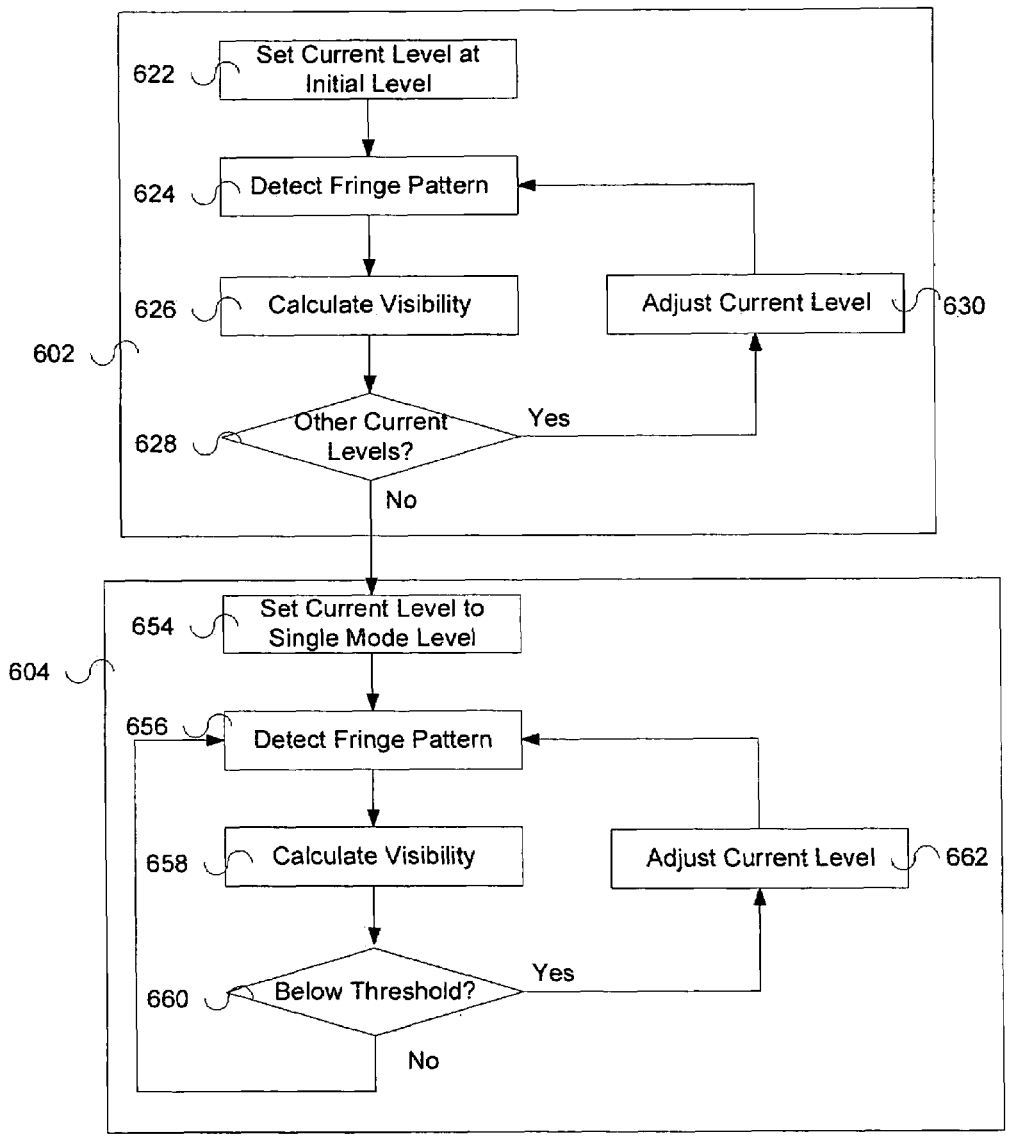
FIG. 6 is flow chart illustrating a method for detecting multiple lasing modes and adjusting the current of a laser source according to an embodiment of the present invention.

System 300 of FIG. 3 may be used to determine whether light source 102 (e.g., a laser) is producing multiple lasing modes. FIG. 6 shows an exemplary flow chart, indicated generally as 600, of an embodiment of a method for detecting multiple lasing modes and adjusting the current of a laser as light source 102. (For explanatory purposes, method 600 will be described with reference to system 300 of FIG. 3.) Prior to performance of flow chart 600, system 100 may be calibrated. This calibration may involve obtaining output readings of detector array 316 measured at the same time that an optical spectrum analyzer with resolution high enough to measure the actual power of the wavelengths in the source light. Then an algorithm may be chosen that takes the values from detector array 316 and computes a fringe visibility number that correlates with the measured side mode suppression ratio (SMSR). The algorithm may in certain embodiments be $V=(Imax-Imin)/(Imax+Imin)$. Although the present embodiments will be described with reference to a visibility, V, calculated in accordance with the algorithm $V=(Imax-Imin)/(Imax+Imin)$, there may be other useful algorithms. Further, these different algorithms may be evaluated during this calibration to determine to determine which is best. Once the fringe visibility algorithm is chosen, then the range of visibility numbers that correspond to the single mode and multimode operation of the light source may be determined. This determined algorithm may then be used for all subsequent calculations of fringe visibility, V, with this detector. Further, during this calibration stage, a "Threshold" level may be determined that could be used in the subsequent "Operation" function of the device described with reference to FIG. 6.

Referring back to FIG. 6, in operation, light source 102 may initially undergo a start up routine 602 by scanning through the current range of light source 102 and calculating the visibility for each possible current value. For example, start up routine 602 may be accomplished by processor 318 initially setting the current for light source 102 at its minimum value (step 622). The fringe pattern for this current value may then be detected by detector array 316 (step 624). This detected fringe pattern may then be provided to processor 318, which calculates the visibility (step 626). The visibility may be calculated by determining the maximum and minimum detected values from detector array 316 (which corresponds to the minimum and maximum light intensities across the fringe pattern, and then calculating $V=(Imax-min)/(Imax+Imin)$.

Next, it may be determined whether or not the visibility for other current values should be determined (step 628). If so, the current level may be adjusted (step 630) and steps 624 and 626 may be repeated for this new current level to calculate the visibility at this current level. For example, in an embodiment, the current for light source 102 may be adjustable in 0.1 mA increments and the current level may range from 66.7 mA to 68.1 mA. In such an example, the current may initially be set at 67.1 mA and the visibility calculated. The current level may then be increased to 67.2 mA and the visibility calculated at this current level. Steps 624 through 632 may then be repeated until the maximum current level (e.g., 68.1 mA) is reached. These minimum and maximum current levels and the increment of 0.1 mA are only exemplary, and other minimums, maximums, and increments may be used. In addition, other parameters besides the current may be varied during start up routine 602 of the laser, including temperature, optical path length or the position of an optical element such as a grating. In addition, other methods may be used during start up routine 602. For example, rather than starting at the minimum, the method may start at the maximum value. The results of start-up routine 602 may then be stored by processor 318 in a memory or storage device either internal or external to processor 318. Additionally, in yet another embodiment, startup up routine 602 may simply determine, a threshold value T such that the laser is considered single mode for $V>T$ and multimode for $V \leq T$. In this case the flow chart can just be that a parameter in the system can be adjusted until the value of V is above the threshold T.

Figure 7:
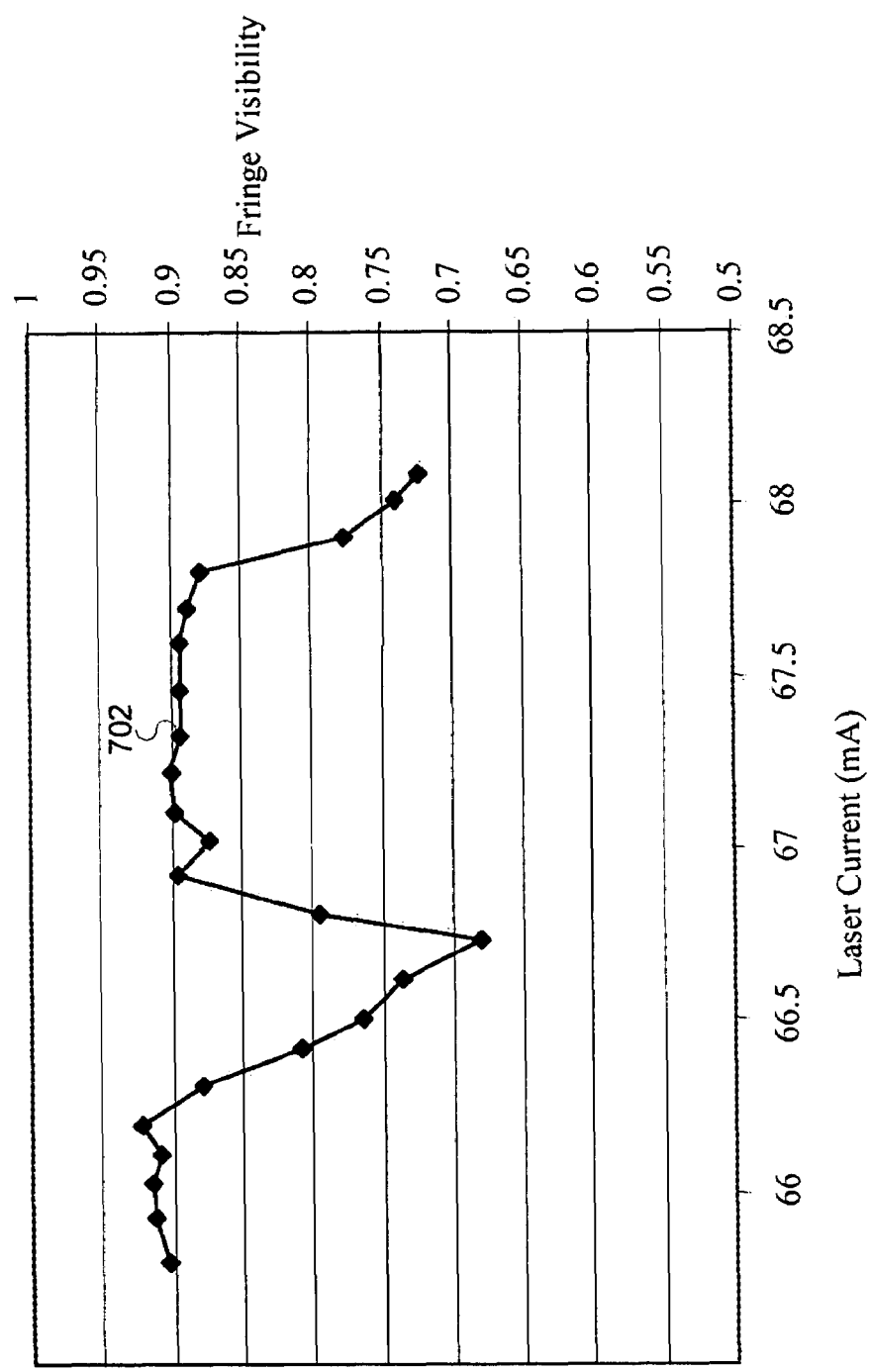
FIG. 7 is graphical representation illustrating an exemplary curve of exemplary results determined by a start up method according to an embodiment of the present invention.

FIG. 7 shows an exemplary curve of results determined by a start up routine such as discussed above with reference to start up routine 602. As shown in FIG. 7, the resulting visibility curve 702 has a maximum of approximately 0.9 between approximately 65.7 mA and 66.2 mA and also between 67 mA and 67.7 mA. Further, the visibility is decreased between 66.3 mA and 66.9 mA. As discussed above, a decreased visibility indicates the presence of additional undesired wavelengths (mA) in the main beam 304. As can be seen by comparison, curve 702 is similar to curve 202 of FIG. 2.

Referring again to FIG. 6, after start up routine 602 is carried out, system 300 may next enter a monitoring routine 604. Monitoring routine 604 may initially involve, placing light source 102 in operation by initially setting the current (step 654) to a current level at which light source 102 will produce only a single lasing mode (i.e., a single wavelength). In an embodiment, one of two different techniques may be used for setting this initial current level: 1) a current level may be chosen that produces a maximum visibility; or 2) a current level may be chosen that is a center point of a plateau (e.g., the widest plateau). With regard to the first technique (see, for example, FIG. 7), the maximum illustrated visibility is 0.91 and occurs at a current level of 66.2 mA. Thus, using the first technique, the current level may be initially set to 66.0 mA (step 628). With regard to the second technique, the widest plateau occurs between 67 mA and 67.7 mA. As such, using this second technique the current level 67.4 mA $((67.7-67)/2=67.35)$ may be used. For exemplary, purposes this midpoint was rounded up to the 0.1 mA increment of 67.4 mA, but in other examples, it may be rounded down. As used herein, the term "plateau" refers to a range of current levels in which the calculated visibility is relatively level (e.g., all visibilities across the range are with 0.1 of each other). Besides these two exemplary techniques for selecting an initial current level according to step 654, other techniques may be used to carry out step 654.

After the current level is set in step 654, light source 102 may be used for reading and writing data, such as discussed above. In this embodiment, light source 102 may continue to be monitored for the presence of additional undesired modes. For example, in step 656, the fringe pattern may be continually detected by detector array 316 and provided to processor 128 for calculating the visibility (step 658). Calculating the visibility according to step 658 may, for example, occur continually or, for example, at periodic intervals, such as, for example, every 0.1 ms, 1 second, 1 minute, 1 hour, etc.

This calculated visibility (step 658) may then be checked to see if it has dropped below a threshold value (step 660). This threshold value may be predetermined, or for example, be calculated based on the results of the above-discussed start up routine 602. For example, in the exemplary curve of FIG. 7, the maximum visibility is approximately 0.9. In such an example, the threshold may be set at 0.1 below this maximum visibility (e.g., 0.8).

If the visibility has not dropped below the threshold value, method 600 may return to step 656 to continue to monitor the visibility. If, however, the visibility drops below the threshold value, processor 318 may readjust the current of light source 102 (step 662). For example, processor 318 may either increase or decrease the current level by a particular increment (e.g., 0.1 mA). Various techniques may be used for adjusting the current level without departing from the invention. For example, processor 318 may use the results of start up routine 602 to determine whether it is more likely that an increase or decrease will result in improved visibility. For example, if the current level was previously at an edge of a plateau, the current level may be adjusted in the direction that will place the current level more in the center of the plateau. Processor 318 may also store, for example, in memory or storage, the previous adjustments to current levels and the calculated visibility, or a subset of these results (e.g., the last 5 current levels and their calculated visibilities) and may use this information in selecting the adjustment to the current level. For example, if a particular current level resulted in a visibility that fell below the threshold, the method may select not to adjust the current level to this particular current level, but instead select to adjust the current level in the opposite direction.

After the current level is adjusted at step 660, visibility of the fringe pattern may be monitored again according to step 656. In one embodiment, steps 654 through 662 may be carried out continuously for the life of holographic system 100. Further, although in this embodiment, the current level is adjusted to maintain light source 102 in single mode, in other embodiments other mechanisms may be used. For example, a temperature for the system (e.g., the laser) may be varied, or an optical path length or position of an optical element (e.g., a waveplate, grating, etc.) included in the system (e.g., an optical element of or within the laser) may be varied. Or, for example, combinations of these and or other variables.

Figure 8:
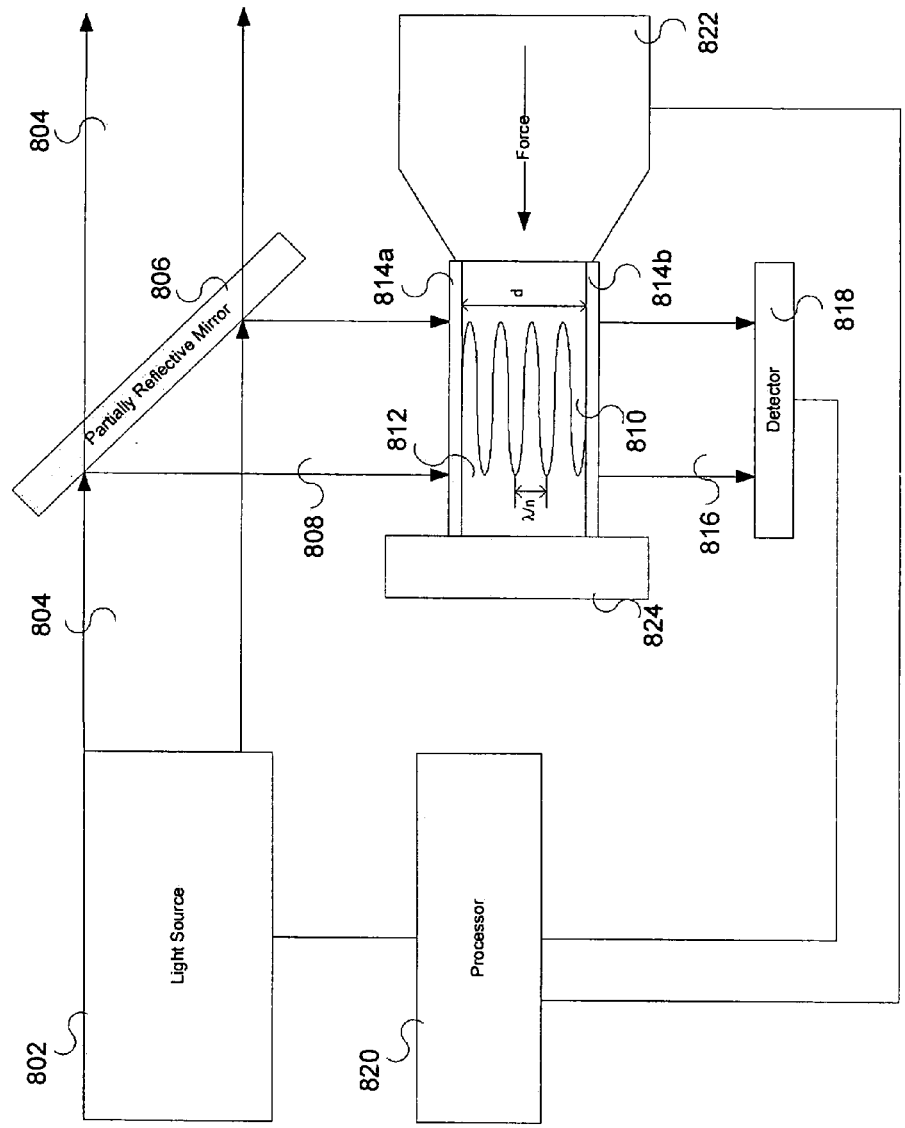
FIG. 8 is an architectural block diagram showing the components of a system using an etalon in laser mode stabilization according to an embodiment of the present invention.

FIG. 8 shows an exemplary system using an etalon in laser mode stabilization, indicated generally as 800. As shown in FIG. 8, main coherent light beam 804 is directed along a light path from coherent light source 802. Main beam 804 is directed to a partially reflective mirror 806 placed in the light path of coherent light source 802. Partially reflective mirror 806 may reflect a portion of main beam 804 in the direction of etalon 810 to form. sample beam 808. Partially reflective mirror 806 may be, for example, a piece of glass coated with a silver coating, aluminum coating, dielectric coating etc., which is capable of reflecting a portion (e.g., <5%) of main beam 804 to form sample beam 808. Etalon 810 may also be known as a Fabry-Perot interferometer.

As shown in FIG. 8, etalon 810 may comprise a glass element 812 with parallel reflective surfaces 814a and 814b. These parallel surfaces 814a and 814b may have aluminum coatings, silver coatings, etc., applied thereto in order to make surfaces 814a and 814b reflective. Although etalon 810 may comprise a glass, element 812 may also be manufactured from other suitable materials, such as, for example, a plastic, quartz, fused silica, etc.

Parallel surfaces 814a and 814b may be separated by a distance, L, and, as noted above, each has a reflectivity, R. These values may be, for example, L=2 mm and R=95%. A more detailed description of etalon 810 distance, L, and reflectivity, R, is provided below.

An output beam 816 may exit etalon 810 where it is detected by a detector 818. Detector 818 may be any type of device capable of detecting light, such as, for example, a CCD, Active Pixel Sensor (APS), a photodiode, etc. Detector 818 may be used to detect the transmission power in terms of, for example, milliwatts (mW) or microwatts (μW).

Detector 818 may be connected to a processor 820. Processor 820 may be any type of device capable of executing an algorithm to analyze the resulting spectrum from etalon 810 as the optical path length is varied. In one embodiment, processor 820 may, for example, be connected to processor 120 of FIG. 1 for exchanging information between processor 820 and 120, such as, for example, to allow processor 120 to monitor information regarding the lasing mode(s) of coherent light source 102 (i.e., light source 802 in this example).

The transmission power of output beam 816 may be defined by $$T = \left[1 + \frac{4R}{(1-R^2)}\sin^2\left(\frac{\phi}{2}\right)\right]^{-1},$$

where T=transmission, R=reflectivity of each parallel surface 814a and 814b, and φ=the roundtrip phase change of the light ray. If any phase change at parallel surfaces 814a and 814b are ignored, then $$\phi = \frac{2\pi}{\lambda}2nd\ \cos\theta,$$

where λ=the wavelength of the light, n=the index of refraction of glass element 812, d=the distance between the mirrors, and θ=the angle of the incoming beam. Sample beam 808 may be perpendicular to etalon 810, thus θ=0, and $$\phi = \frac{4\pi nd}{\lambda}.$$

As an initial assumption, it may also be assumed that only one wavelength is present in main beam 804.

The number of half wavelengths, M, that fit between parallel surfaces 814a and 814b in a single pass (e.g., from one parallel surface (e.g., 814a) to the other parallel surface (e.g., 814b)) may be defined by the equation M=2nd/λ. Thus, in this example, φ=2Mπ. As such, the transmission, T, will be maximized when M is a whole number. That is, the transmission, T, through etalon 810 will be maximized when a whole number of half wavelengths fit between parallel surfaces 814a and 814b. Further, the optical path ($O_p$) through etalon 810 in this example is $O_p$=nd. Thus, M=$2O_p$/λ. Accordingly, for a constant wavelength, M, may vary as the optical path, $O_p$, varies.

In an embodiment, the physical distance between parallel surfaces 814a and 814b may remain largely constant and the index of refraction, n, for glass element 812 will be changed to vary the optical path, $O_p$. For example, glass element 812 may be manufactured using a type of glass with an index of refraction, n, that varies based on the force applied to the glass element (as is the case with most materials). This force may be applied to glass element 812 using a transducer 822 capable of applying a force to etalon 810. Transducer 822 may, for example, be a piezo transducer (also referred to as a piezo actuator) that is, for example, roughly 10×10×18 mm in size with etalon 810 being approximately 5×5×2 mm in size. Transducer 822 may also be connected to processor 820 for receiving signals there from which determine the amount of force to be applied to etalon 810. Note that the direction of the applied force may not be important since the refractive index change results from compression. Thus, for example, the force may be applied in the direction of beam 808's propagation, so long as, for example, the optical path through the etalon is not obscured System 800 may include a brace 824 on the opposite side of etalon 810 from transducer 822 for maintaining etalon 810 in place while force is applied by transducer 822. Although a transducer may be used for applying force to etalon 810 to modify its optical path, $O_p$, other types of devices may also be used for applying force to etalon 810, such as, for example, electromagnetic actuators, motors etc.

In another embodiment of system 800, the optical path, $O_p$, between parallel surfaces 814a and 814b may be modified by changing the physical distance between these surfaces 814a and 814b. For example, instead of a glass element 812, etalon 810 may comprise a gas (e.g., air) between parallel surfaces 814a and 814b. In such an embodiment, mechanical devices (e.g., actuators) may be used to physically vary the distance between surfaces 814a and 814b. In this embodiment, parallel surfaces 814a and 814b may be partially reflective coatings included on two separate elements, where the physical distance between these elements (and their respective reflective surfaces) may be modified. These elements may be manufactured from glass, plastic, or any other suitable material.

Figure 9:
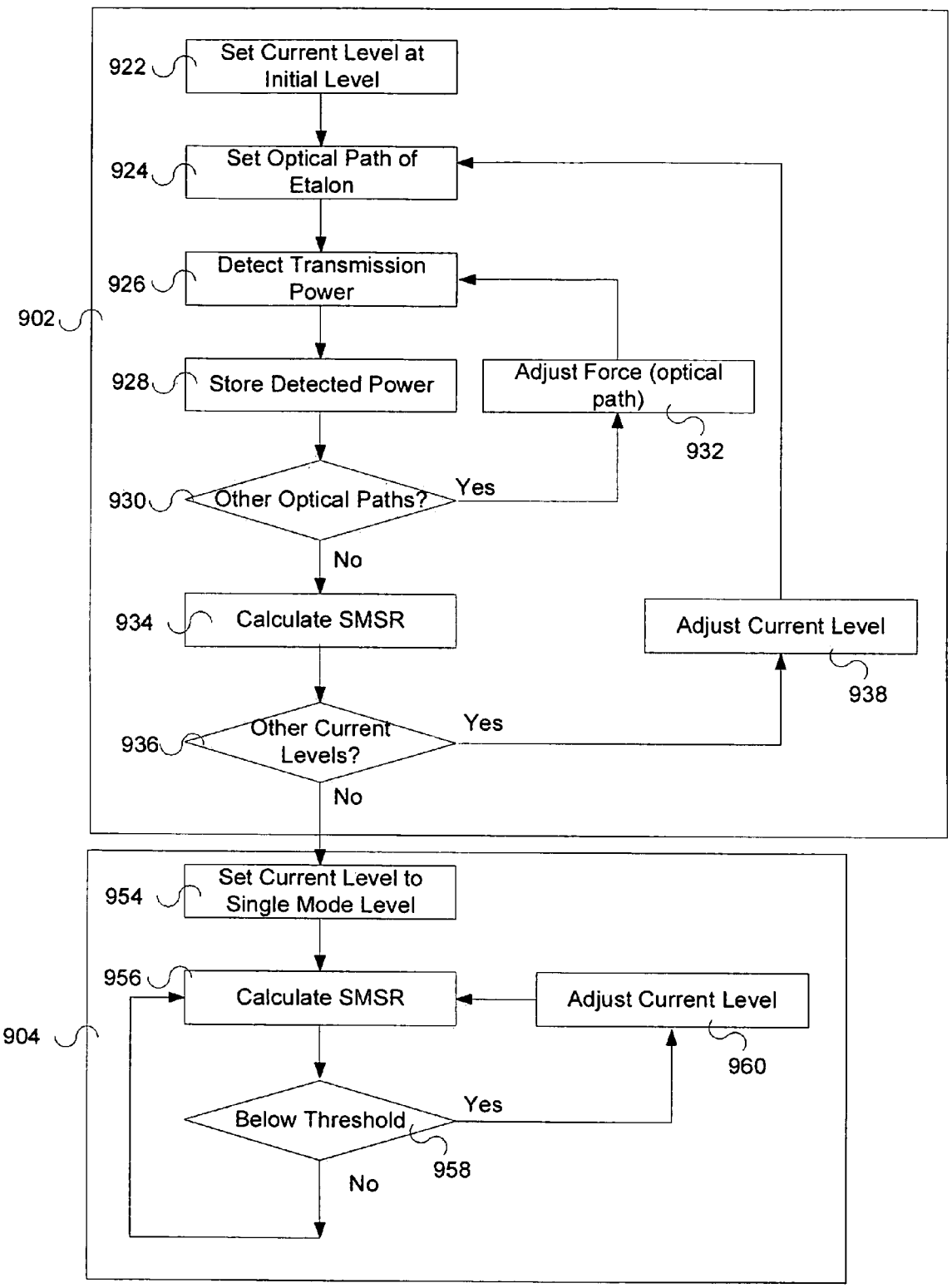
FIG. 9 is a flow chart illustrating a method for detecting multiple lasing modes and adjusting the current of a laser source according to an embodiment of the present invention.

FIG. 9 illustrates an exemplary flow chart, indicated generally as 900, of an embodiment of a method for detecting multiple lasing modes and adjusting the current of a laser source. (For explanatory purposes, method 900 will be described with reference to system 800 of FIG. 8 using an etalon 810 whose optical path, $O_p$, is varied by applying a force.)

The effect of changing either the refractive index or mirror spacing of the etalon is to scan the φ parameter above, which in turn causes the transmission, T, to vary, reaching a peak value when parameter M is a whole number. The detected signal follows the transmission, and in effect the wavelength spectrum of the light source is produced when the signal is plotted against refractive index, n, or mirror spacing of the etalon. If only one wavelength is present, then only one signal peak will be detected as the M parameter varies by 1 (i.e. one Free Spectral Range=FSR). The FSR is defined as the amount the optical wavelength would need to change to create the same peak-to-peak separation at the output of the etalon. FSR=$\lambda^2/(2\,O_p)$. A weak secondary wavelength will show up as a small secondary peak in the spectrum. From this, the main parameter of interest, SMSR may be calculated.

Figure 10:
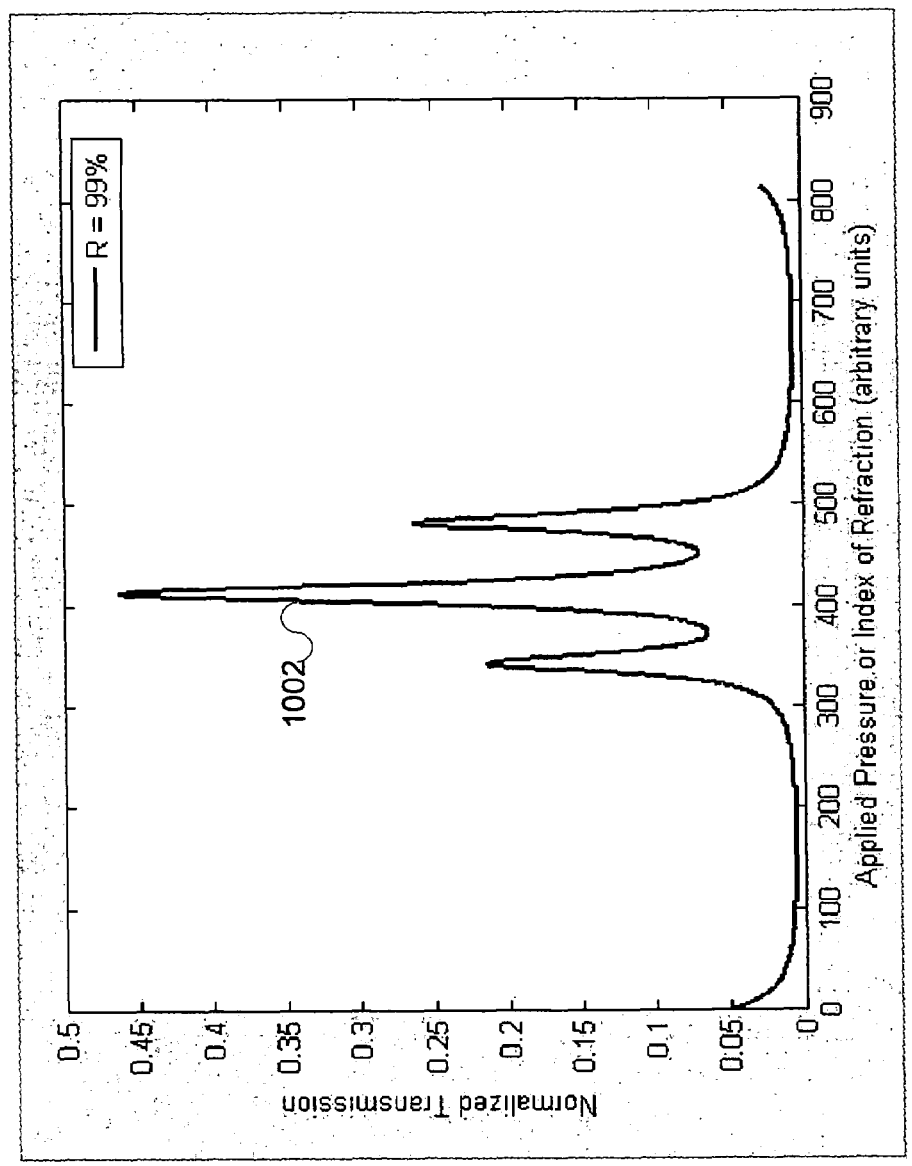
FIG. 10 illustrates an exemplary curve of exemplary transmission powers according to an embodiment of the present invention.

FIG. 10 illustrates an exemplary curve 1002 of exemplary transmission powers detected by detector 818 across a range of optical paths (e.g., different indexes of refraction for etalon 810). In this example, the reflectivity, R, for etalon 810 is assumed to be 99%. The strongest peak of curve 1002 corresponds to the primary wavelength of output beam 816 and as illustrated has a transmission power, $P_1$. The second strongest peak corresponds to a secondary wavelength (i.e., a multimode), and as illustrated has a transmission power, $P_2$. Likewise, the third strongest peak corresponds to a yet another wavelength, and as illustrated has a transmission power, $P_3$.

The SMSR may be calculated by dividing the highest detected transmission power, $P_1$, by the transmission power of the next highest peak, $P_2$:SMSR=$P_1/P_2$. Thus, a high value of SMSR (approaching infinity), indicates no additional modes (i.e. wavelengths) are present, while an SMSR of 1.0 (equivalent to 0 dB) indicates multiple equal power modes are present. In this example, P1 is 0.46 and P2 is 0.26, thus SMSR=0.46/0.26 or SMSR=1.8 (equivalent to 2.5 dB). Further, the SMSR may also be converted to a logarithmic scale, such as, for example, dB.

Referring back to FIG. 9, initially, in operation, light source 802 (e.g., a laser) may undergo a start up routine 902 by scanning through the current range of light source 102 and calculating the SMSR, for each possible current value. For example, start up routine 902 may be accomplished by processor 820 initially setting the current for light source 802 at its minimum value (step 922). The optical path through the etalon, $O_p$, may then be set at a minimum distance (step 924). In step 924, the optical path, $O_p$, may be varied by modifying the force applied to etalon 810 by transducer 822 and processor 820 may be used to direct transducer 822 to apply a particular force.

The transmission power of output beam 816 for this current value and optical path, $O_p$, may then be detected by detector 818 (step 926). This detected transmission power, T, may then be provided to processor 820 and stored, for example, in a memory or storage device (step 928). In step 930, it may be determined whether additional measurements should be made, e.g., whether a transmission power for this current level but at a different optical path should be obtained. If the answer is "yes," processor 820 may direct transducer 822 to modify the force applied to etalon 810 (step 932). The transmission power, T, of output beam 816 may then be detected by detector 818 (step 926) and may then be provided to processor 820 (step 928). Steps 926 through 932 may be repeated so that measurements for optical paths, $O_p$, across at least one free spectral range (FSR) of the etalon are taken, thus generating a wavelength spectrum of the light source indicating its modes. Further, these measurements are preferably taken so that a sufficient number of points (e.g., 4, 10, 20, etc.) are taken across the FSR to ensure the presence of all possible additional wavelengths has been detected. The detected transmission powers, T, may then be provided to processor 820, which calculates the SMSR (step 934).

Figure 11:
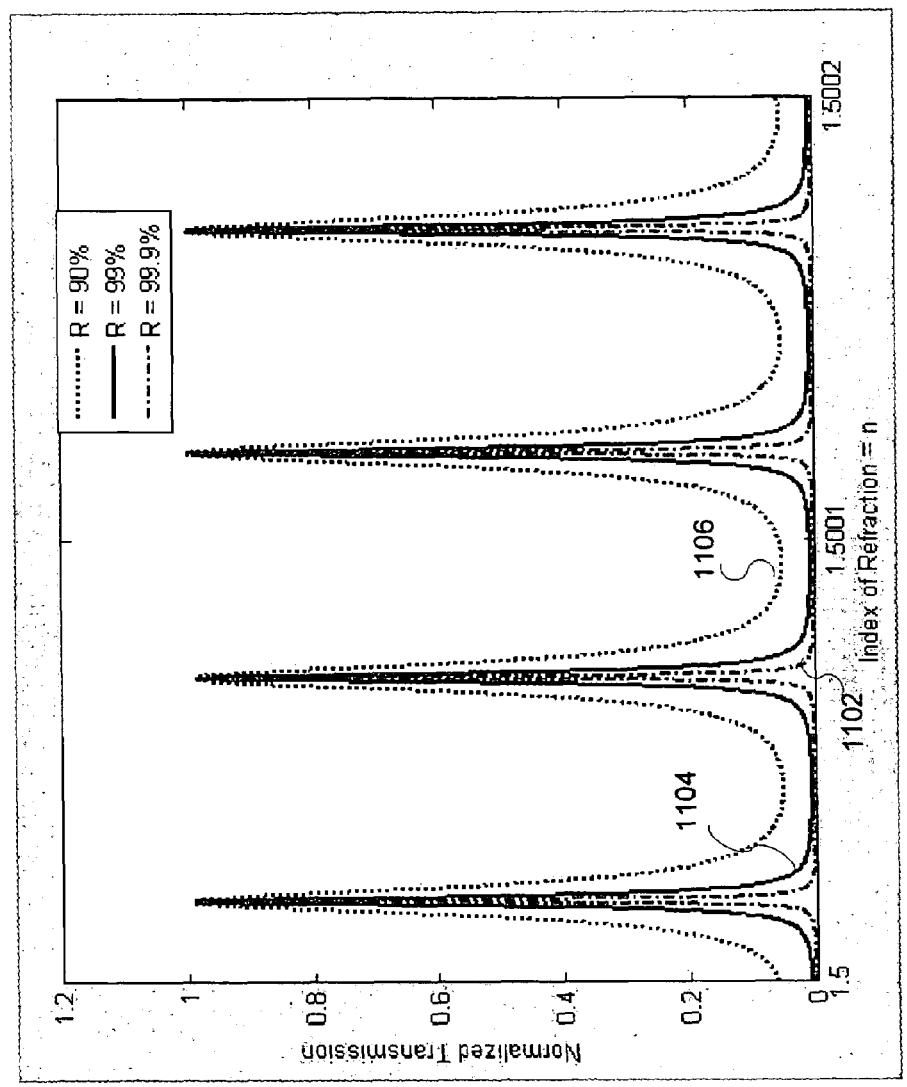
FIG. 11 is a graphical representation of detected exemplary normalized transmission powers, T, for a single mode laser according to an embodiment of the present invention.

FIG. 11 shows detected exemplary normalized transmission powers, T, for a single mode laser. FIG. 11 provides three curves, curve 1102 where the reflectivity, R, of surfaces 814a and 814b is R=0.999, and a curve 1104 where R=0.99, and a curve 1106 where, R=0.9. For simplicity, only curve 1102 will be discussed in the following description although, as shown in FIG. 11, other reflectivities may be used. As shown in FIG. 11, curve 1002 has a maximum of approximately 1 at the following indices of refraction, n: 1.50002, 1.50008, 1.50012, and 1.50018. As noted above, the index of refraction, n, is directly proportional to the optical path and the distance between peaks is equal to the FSR. In this example, the index of refraction is increased such that the etalon scans across the range of 4 FSRs. These 4 repeated peaks represent the same wavelength spectrum, repeated every free spectral range. The fact that only one peak is visible within every FSR range indicates only one wavelength is present, and the light source is effectively single mode.

Figure 12:
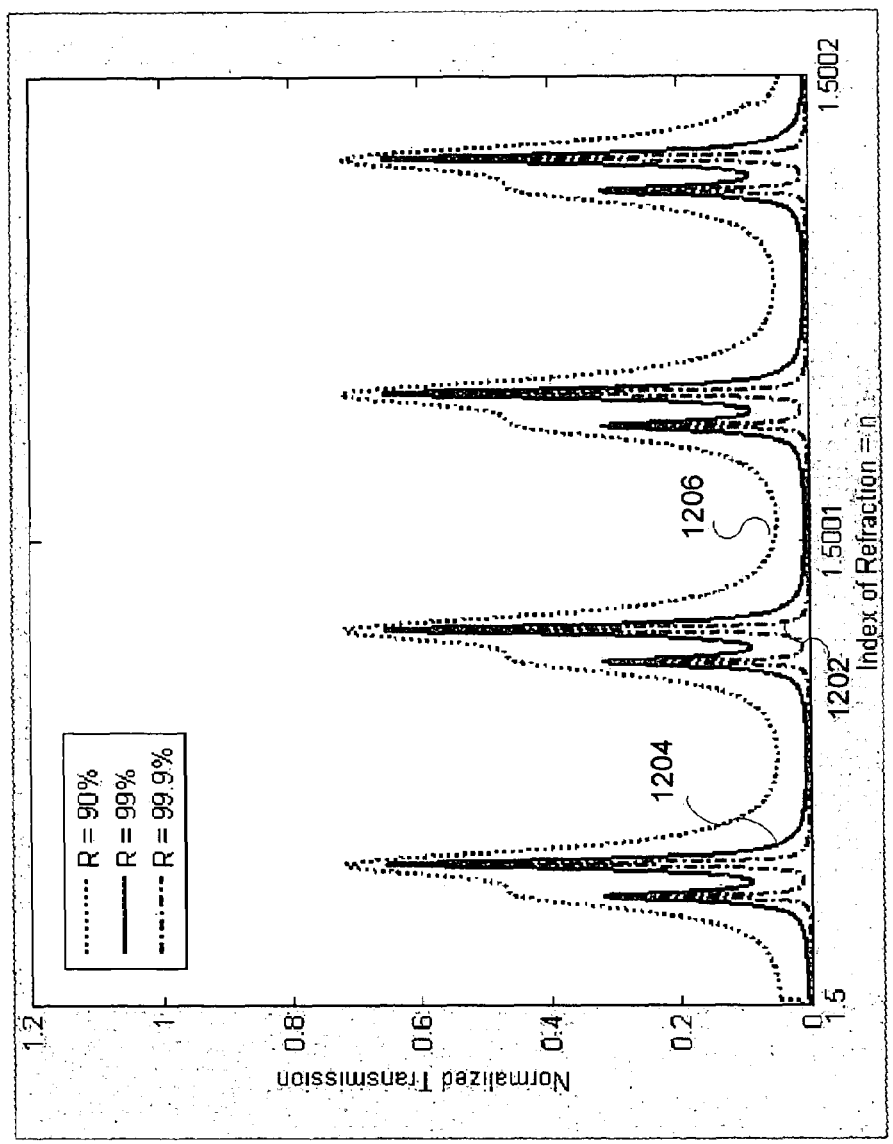
FIG. 12 is a graphical representation of an exemplary fringe pattern for a multi mode laser according to an embodiment of the present invention.

FIG. 12 shows an exemplary fringe pattern for a multi mode laser. In this case, the scanning range is the same length as in FIG. 11 and is equivalent to 4 FSRs. There are 2 peaks can be seen within each FSR. FIG. 12 provides three curves, curve 1202 where the reflectivity, R, of surfaces 814a and 814b is R=0.999, and a curve 1204 where R=0.99, and a curve 1206 where, R=0.9. As can be seen, in embodiments it may be desired for the reflectivity, R, to be such that it is sufficient to capture peaks resulting from secondary modes that may have a wavelength close to that of the primary wavelength.

Referring again to FIG. 9, in step 936 it may be determined whether or not the SMSR, for other current values should be determined. If the answer is "yes," the current level is adjusted (step 938) and steps 924 through 934 may be repeated for this new current level to calculate the SMSR at this current level. For example, the current for light source 802 may be adjustable in 0.1 mA increments and the current level range for light source 802 may range from 66.7 mA to 68.1 mA. The current may be initially set at 67.1 mA and the SMSR then calculated. The current level may then be increased to 67.2 mA and the SMSR calculated at this current level. Steps 924 through 938 may be repeated until the maximum current level (e.g., 68.1 mA) is reached. These minimum and maximum current levels and the increment of 0.1 mA are exemplary only and other minimums, maximums, and increments may be used. In addition, other methods for start up besides start up routine 902 may be used. For example, rather than starting at the minimum, the method may start at the maximum value. The results of start up routine 902 may then be stored by processor 820 in a memory or storage device either internal or external to processor 820. The results of start up routine 902 may also result in an exemplary curve such as discussed above with reference to FIG. 7.

After start up routine 902 is carried out, a method similar to method 600 of FIG. 6 may be used for adjusting the current level of light source 802 so that only a single mode of light is present in main beam 804. For example, light source 802 may be placed in operation by entering a monitoring routine 904. Initially monitoring routine 904 may set the current (step 954) at a current level in which light source 802 should produce only a single lasing mode. In an embodiment, one of two different techniques may be used for setting this initial current level: 1) a current level may be chosen that produces a maximum SMSR; or 2) a current level may be chosen that is at a center point on a high SMSR a plateau.

After the current is initially set, light source 802 may be used for reading and writing data, such as discussed above. In this embodiment, light source 802 may continue to be monitored for the presence of additional undesired lasing modes. For example, in step 956, the SMSR of output beam 816 may be continually calculated by processor 820. Calculating the SMSR according to step 956 may, for example, occur continually or, for example, at periodic intervals, such as, for example, every 0.1 ms, 1 second, 1 minute, 1 hour, etc. A method similar to that discussed above with reference to steps 924 though 932 may be used for checking the SMSR. That is, processor 820 may vary the force applied by transducer 822 to obtain transmission power, T, measurements from detector 818 across a range of optical paths, FSR, that is greater or equal to the FSR.

This calculated SMSR according to step 956 may then be checked to see if it has dropped below a threshold value according to step 958. This threshold value may be predetermined, or for example, calculated based on the results of the above-discussed start up routine 902.

If the SMSR has not dropped below the threshold value, method 900 may return to step 956 to continue to monitor the SMSR. If, however, the SMSR drops below the threshold, processor 818 may readjust the current of light source 802 according to step 960. For example, processor 818 may either increase or decrease the current level by a particular increment (e.g., 0.1 mA). Various techniques may be used for adjusting the current level without departing from the invention.

After the current level is adjusted according to step 960, SMSR may be monitored according to step 956. In one embodiment, steps 956 through 960 may be carried out continuously for the life of the holographic system 100. Further, although in this embodiment, the current level is adjusted to maintain light source 102 in single mode, in other embodiments other mechanisms may be used. For example, a temperature for the system (e.g., the laser) may be varied, or an optical path length or position of an optical element (e.g., a waveplate, grating, etc.) included in the system (e.g., an optical element of or within the laser) may be varied. Or, for example, combinations of these and or other variables.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A system for use with a light source which generates a light beam, comprising:
   a beam splitting device which provides a first reflected portion and a second reflected portion from the light beam, wherein the first and second reflected portions have an angular separation such that the first and second portion intersect;
   a detector which detects a fringe pattern resulting from the intersection of the first and second reflected portions and which provides fringe pattern information;
   a processor which receives the detected fringe pattern information, and which adjusts the light source using the detected fringe pattern information when multiple modes are detected.

2. The system of claim 1, wherein the detected fringe pattern information includes a minimum intensity value and a maximum intensity value wherein the processor calculates a visibility value using the minimum and maximum intensity values.

3. The system of claim 2, wherein the processor determines whether the visibility value is below a threshold value, and if the visibility value is below the threshold value, adjusts the light source.

4. The system of claim 3, wherein the processor iteratively adjusts the light source and calculates the visibility value until the visibility value is determined not to be below the threshold value.

5. The system of claim 1 wherein the beam splitting device comprises an optical wedge comprising a first partially reflective surface and a second partially reflective surface, wherein the first partially reflective surface reflects the first portion of the light beam and wherein the second partially reflective surface reflects the second portion of the light beam.

6. The system of claim 5, wherein the first and second partially reflective surfaces are each provided with a partially reflective coating.

7. The system of claim 6, wherein the partially reflective coating comprises one or more of: a silver coating, an aluminum coating, or a dielectric coating.

8. The system of claim 1, wherein the detector is a charged coupled device.

9. The system of claim 1, wherein the processor adjusts the light source by adjusting a current level for the light source.

10. The system of claim 1, wherein the processor adjusts the light source by adjusting one or more of the following: a temperature for the light source, an optical path length for an optical element, or a position for an optical element.

11. The system of claim 1, wherein the system is included in a holographic storage device.

12. The system of claim 1, wherein the processor adjusts the light beam to a single mode when multiple modes are detected.

13. A method for use with a light source which generates a light beam, comprising the following steps of:
   (a) forming a first portion and a second portion from the light beam, wherein the first and second reflected portions have an angular separation such that the first and second portions intersect;
   (b) detecting a fringe pattern resulting from the intersection of the first and second portions to thereby provide fringe pattern information; and
   (c) adjusting the light source using the detected fringe pattern information when multiple modes are detected.

14. The method of claim 13, wherein the detected fringe pattern information of step (b) includes a minimum intensity value and a maximum intensity value, and comprising the following additional steps of:
   (d) calculating a visibility value using the minimum intensity value and the maximum intensity value;
   (e) determining whether the visibility value is below a threshold value; and
   (f) if the visibility value is below the threshold value, adjusting the light source.

15. The method of claim 14, wherein steps (d) through (f) are carried out by iteratively adjusting the light source and calculating the visibility value until the visibility value is determined to not be below the threshold value.

16. The method of claim 13, wherein step (c) comprises adjusting a current level of the light source.

17. The method of claim 13, wherein step (c) comprises one or more of the following steps: adjusting a temperature for the light source, adjusting an optical path length for an optical element, or adjusting a position for an optical element.

18. The method of claim 13, wherein step (b) is carried out using a charged coupled device.

19. The method of claim 13, wherein step (a) is carried out by an optical wedge.

20. The method of claim 13, wherein step (c) is carried out by adjusting the light source to a single mode when multiple modes are detected.

21. A system for use with a light source which generates a light beam, the system comprising:

means for forming a first reflected portion and a second reflected portion from the light beam, wherein the first and second reflected portions have an angular separation such that the first and second portion intersect;

means for detecting a fringe pattern resulting from the intersection of the first and second portions to thereby provide fringe pattern information; and means for adjusting the light source using the detected fringe pattern information when multiple modes are detected.

22. The system of claim 21, further comprising:

means for calculating a visibility value using a minimum intensity value and a maximum intensity value detected by the means for detecting a fringe pattern;

means for determining whether the visibility value is below a threshold value; and means for directing the means for adjusting to adjust the light source if the visibility value is below the threshold value.

23. The system of claim 21, wherein the means for adjusting comprises means for adjusting a current level of the light source.

24. The system of claim 21, wherein the means for adjusting comprises one or more of the following: means for adjusting a temperature for the light source, means for adjusting an optical path length for an optical element, or means for adjusting a position for an optical element.

25. The system of claim 21, wherein the adjusting means adjusts the light source to a single mode when multiple modes are detected.

* * * * *